July 25, 1939.　　　D. O. SPROULE　　　2,167,492
METHOD OF ECHO SOUNDING AND MEANS THEREFOR
Filed Dec. 14, 1935　　　3 Sheets-Sheet 1
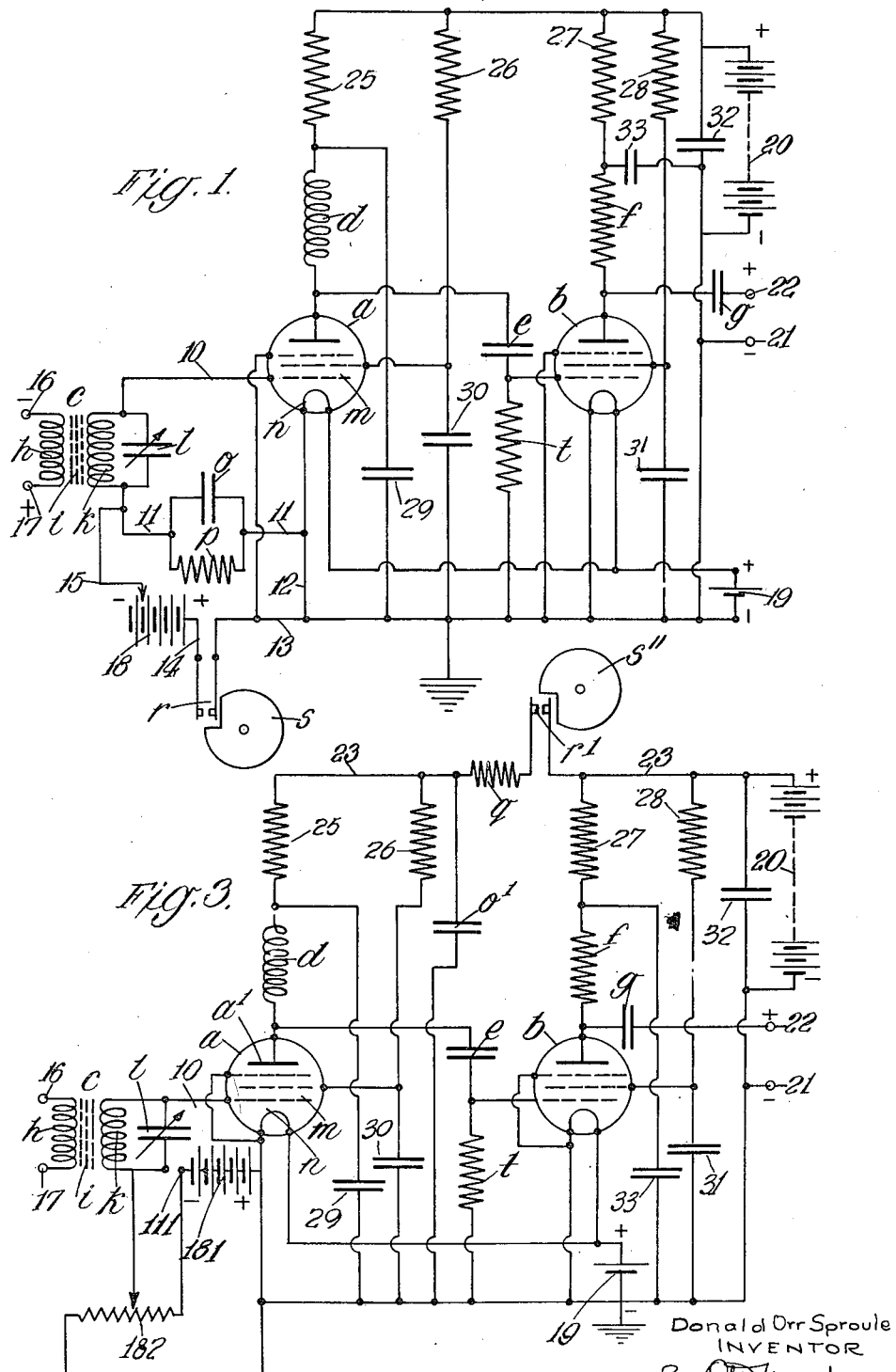

July 25, 1939.  D. O. SPROULE  2,167,492
METHOD OF ECHO SOUNDING AND MEANS THEREFOR
Filed Dec. 14, 1935   3 Sheets-Sheet 2
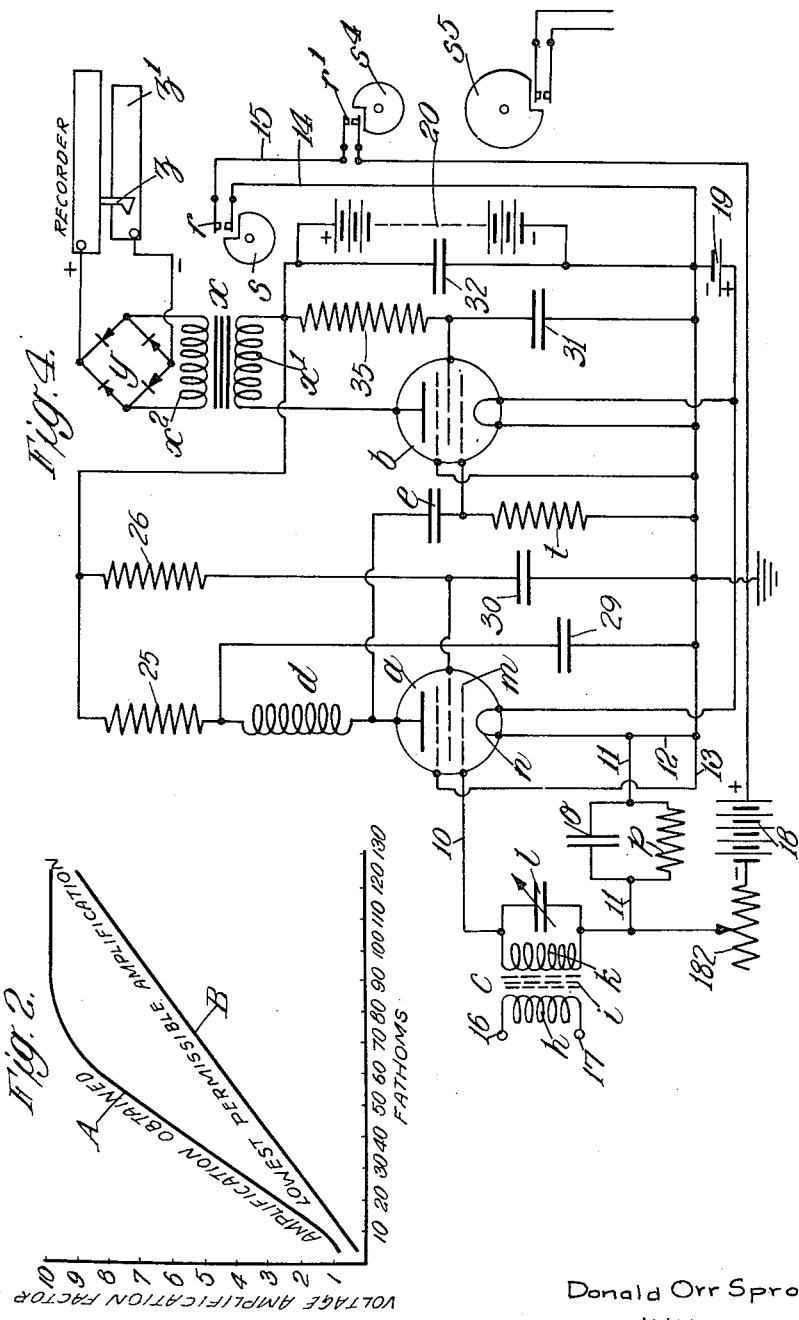
Donald Orr Sproule
INVENTOR July 25, 1939.　　　D. O. SPROULE　　　2,167,492
METHOD OF ECHO SOUNDING AND MEANS THEREFOR
Filed Dec. 14, 1935　　　3 Sheets-Sheet 3
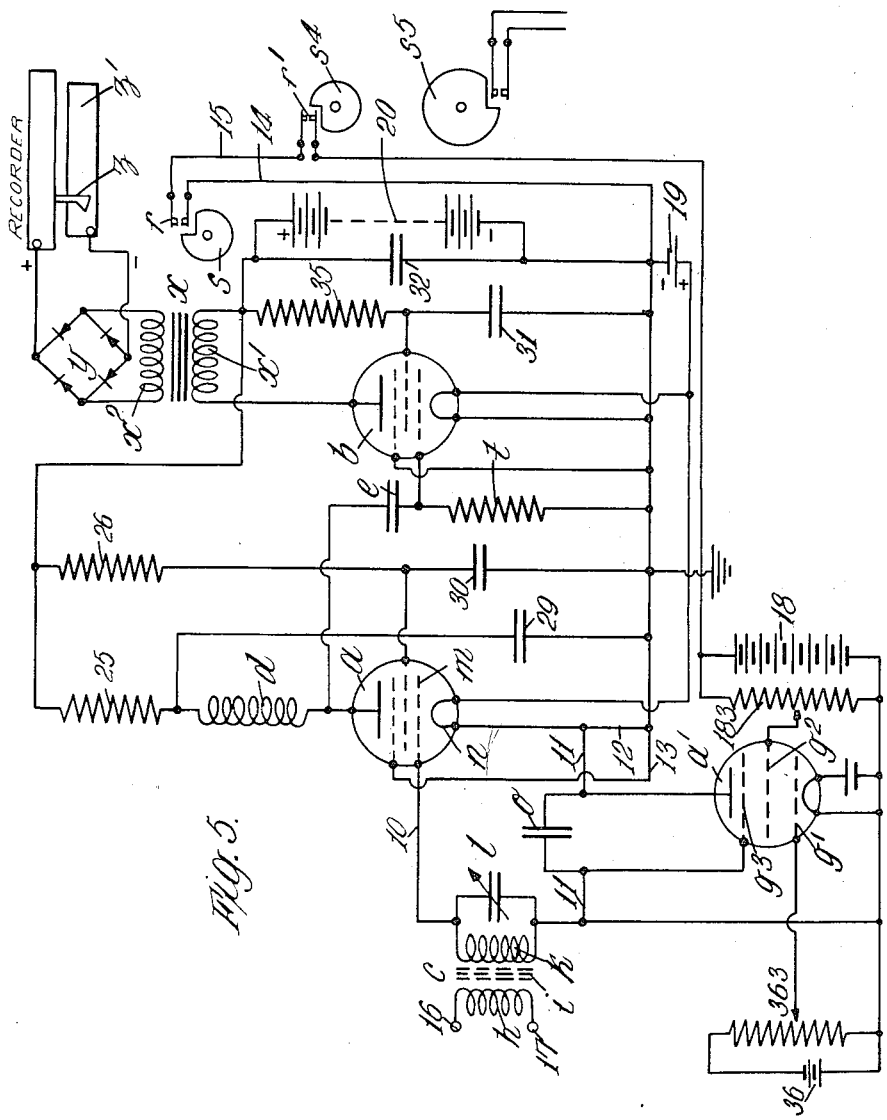
Donald Orr Sproule
INVENTOR
his ATT'Y.

Patented July 25, 1939

2,167,492

UNITED STATES PATENT OFFICE 2,167,492

METHOD OF ECHO SOUNDING AND MEANS THEREFOR

Donald Orr Sproule, London, England, assignor of one-half to Henry Hughes & Son, Limited, London, England Application December 14, 1935, Serial No. 54,378
In Great Britain January 14, 1935

4 Claims. (Cl. 177—386)

This invention relates to improvements in methods of echo sounding and means therefor and has reference to the thermionic amplifiers used with echo sounding installations in which a series of pulses, which are the echoes of sound pulses emitted at intervals of time, are received and amplified for the purpose of graphic recordance and/or visual indication.

During the manipulation of echo sounding apparatus of the kind specified, manual adjustment of the sensitivity of the thermionic amplifier has to be made, when the depth measured changes, to maintain the output of the amplifier substantially constant and to prevent the indicating or recording apparatus being affected detrimentally by spurious noises such as ship's noises, electrical interference, signal transmission noises and signal reverberations so as to cause confusion with the reception of the echo pulse.

The invention has for its main object to enable depths to be ascertained more easily, more reliably and with less confusion than has been possible in the past.

Another object of the invention is to provide means whereby the sensitivity of the receiving apparatus as a whole is adjusted automatically during use thereby reducing the degree of skill and attention necessary compared with that which has had to be exercised with known apparatus.

A further object of the invention is to provide means whereby the ascertainment of shallow depths of less than, say 10 fathoms, can be effected with less difficulty and less attention than hitherto.

The invention consists in the arrangement of means for decreasing the factor of amplification to a minimum at or immediately prior to the emission of each sound pulse and for allowing said factor of amplification to increase automatically from said minimum at such a rate that at each instant of time after the emission of each sound pulse, the amplification available is adequate only for the effective recordance and/or indication of the echo pulse so that substantial recordance and/or indication of spurious noise pulses which occur during the initial parts of the time periods between the emission of sound pulses is minimised and means for suppressing the effect of voltage surges produced in the amplifier during the automatic variations of the factor of amplification.

In the drawings—

Figure 1 shows diagrammatically one kind of arrangement for carrying the invention into effect;

Figure 2 is a diagram showing the performance of the arrangement shown in Figure 1, relatively to known requirements;

Figure 3 shows diagrammatically an arrangement in which the anode potential of one of the valves is varied instead of the bias potential;

Figure 4 shows an arrangement in which the basic circuit shown in Figure 1 is applied to a depth recorder adapted to produce a trace on chemically prepared paper.

Figure 5 shows an arrangement similar to that shown in Figure 4 generally but developed by the substitution of a thermionic valve for the dissipation resistance.

In a general way it is possible to make the sensitivity of a thermionic amplifier a function of time by varying the values of some of the impedances in circuit in the desired direction relatively to a time base.

For instance, the value of the grid bias voltage and hence the amplification factor may be made dependent on the voltage of a fixed control condenser which is charged negatively at the instant of transmission of the signal pulse, and which is allowed to discharge at the desired rate through a resistance.

The two stage amplifier shown in Figure 1 comprises five-electrode thermionic valves or pentodes $a$ and $b$ and an input transformer $c$; the first stage is choke-capacity coupled to the second by the choke $d$ and condenser $e$ whilst the second stage is resistance-capacity coupled to the output by the resistance $f$ and condenser $g$, the usual feed resistances 25 and 27, leak $t$ and by-pass condensers 29, 31, 32 and 33 as well as the usual feed resistances 26 and 28, condensers 30 and 31 and connections to the control and auxiliary grids of the pentodes $a$ and $b$ being provided.

The input transformer $c$ comprises a primary winding $h$, a core $i$ and secondary winding $k$, said secondary winding $k$ being tuned by a variable condenser $l$.

The high potential end of the tuned circuit $k\,l$ is connected to the grid $m$ of the pentode $a$ by means of a conductor 10 whilst the low potential end of the tuned circuit $k\,l$ is connected to the negative leg of the filament $n$ of the pentode $a$ by a conductor 11.

In this arrangement the sensitivity of the amplifier at the moment of receiving the echo pulse is controlled automatically by regulating the value of the bias applied to the grid $m$ of the pentode $a$ in timed relation with the actuation of the sound pulse transmitting apparatus.

To this end the conductor 11 includes a control condenser *o* shunted by a resistance *p* of such value as will allow any charge on the control condenser *o* to leak off in accordance with a recognised law at a defined rate on a time basis.

The control condenser *o* is charged from the battery 18 when the switch *r* completes the circuit through the conductors 11, 12, 13, 14 and 15, which completion occurs at intervals of time usually at about four times per second, through the intermediation of the cam *s* which is rotated in timed relation with the actuation of the sound pulse transmitting apparatus and which is so adjusted that the switch *r* is closed for a short time and then opened immediately prior to the moment of emission of each sound pulse.

In order to avoid the voltage surge produced by variation in the grid bias voltage specified above from being transferred to the pentode *b*, an intervalve coupling designed to present a higher impedance to that pulse than to the echo pulse is provided, the filtering effect being capable of being enhanced when necessary and possible by the type and/or design of the couplings between succeeding valves, if any, and the last valve and the output.

Although the basic arrangement of the amplifier is not unusual in character, the conditions under which it is used necessitate that it must be capable of amplifying a small echo pulse of say only .02 volt, up to several volts and at the same time refuse to amplify the large voltage swing due to the discharge of the condenser *o*, to more than a fraction of a volt. For example, in a particular instance the amplifier has to have an amplification factor of at least one hundred for a pulse of sixteen kilocycles per second and an amplification factor of less than one tenth for a pulse which endures for about one quarter of a second, that is to say, the coupling circuit between *a* and *b* must act as a filter for frequencies as divergent as that of the signal pulse at about sixteen kilocycles per second and the initial suppression pulse or voltage surge at about four cycles per second.

This result is obtained in the arrangement shown in Figure 1 by giving the choke *d*, condenser *e* and resistance *t* suitable values.

To enable the invention to be fully understood and carried into practical effect without difficulty the components, shown in Figure 1, and material to this invention, by way of example only, may have the following characteristics and values.

The pentodes *a* and *b* are of the 2 volt battery type having an anode impedance of about one half of a megohm and a mutual conductance of about 2.2 ma./v. with an anode voltage of about 150 volts, an auxiliary grid voltage of about 150 volts and the control grid at zero volts.

The battery 19 is for the heating of the filaments of the pentodes *a* and *b* and the battery 20 affords a source of high tension supply therefor.

The input transformer *c* is of the dust-core type having a voltage amplification factor of about three hundred and fifty, its secondary winding *k* being tuned by the .0005 microfarad variable condenser *l* to resonate at about sixteen kilocycles per second.

The inductance of the choke *d* is about 10 henrys the capacity of the condenser *e* is about .001 microfarad and the value of the resistance of *t* is about one quarter of a megohm.

The capacity of the biassing control condenser *o* is about two microfarads and the resistance of *p* is about fifty thousand ohms.

The voltage of the battery 18 may be about ten volts, but this can be adjusted as required by varying the voltage tapping as shown in Fig. 1 or by an adjustable resistance 182 of about 25,000 ohms in series circuit therewith as shown in Fig. 3.

The values of the resistances 25, 26 and 27 may be about 10,000 ohms each and of the condensers 29, 30, 31 and 32 about 2 microfarads each whilst the value of the resistance 28 may be about 100,000 ohms and of the condenser 33 about 2 microfarads.

In operation, dealing with a single pulse for the sake of simplicity, the pulse from the echo receiving apparatus is applied to the input terminals 16 and 17 of the primary winding *h* of the transformer *c*, the signal at enhanced voltage induced in the tuned circuit *k l* being conveyed to the grid *m* of the pentode *a* by the conductor 10 and return conductors in the usual way.

As stated above, immediately prior to the emission of the sound pulse from the transmitter of which the received pulse is an echo, the switch *r* is closed mechanically by the cam *s* for a sufficient time to charge the control condenser *o* from the battery 18 after which the switch *r* opens and at that moment the value of the bias on the grid *m* of the pentode *a* being a maximum, the sensitivity of the amplifier is at its lowest value.

Owing to the presence of the shunt resistance *p* the charge on the control condenser *o* gradually leaks off, according to a recognised law, at a defined rate on a time bases and the sensitivity of the amplifier increases correspondingly so that at the moment when the signal, incidental to an echo pulse, is applied to the grid *m* of the pentode *a* the sensitivity of the amplifier has a value that has been found to be most suitable and appropriate to the attenuation of the received pulse due to the distance travelled by the sound pulse and its echo which depends on the time occupied.

21 and 22 are the output terminals.

From the above it will be clear that as the amplifier, improved according to this invention, operates in comparatively insensitive condition during the initial part of each time period between successive pulses when the signal value of the echo pulse is high and only requires little amplification it is not so sensitive to spurious noises with the result that record and/or indication of such noises is suppressed or rendered so insignificant that it occasions no confusion with the record and/or indication of the echo pulse proper but as the distance travelled by the sound pulse increases (increase of depth) and the signal value of the echo pulse decreases the sensitivity of the amplifier increases and always can be made adequate to amplify any echo pulse received, within dimensional limits and relatively to the spurious noise level, sufficiently to comply with practical requirements.

With the arrangement shown in Figure 1 it is possible to obtain a rate of change of voltage amplification factor in relation to depth or time (four hundred fathoms being regarded as the equivalent of one second of time) as shown in curve A of Figure 2 in which the ordinates represent voltage amplification factor in steps of ten thousand, whilst the abscissae represent depths in fathoms in steps of ten, curve B showing the lowest permissible amplification for practical purposes.

In order to apply the basic circuit to practical echo sounding apparatus of known types small and comparatively unimportant variations are called for.

The arrangement shown in Figure 4 indicates the application of the improved amplifier described above to a depth recording instrument of known kind in which a trace is made by a stylus on chemically prepared paper due to a reaction incidental to a flow of electrical current.

Such a recorder requires non-alternating current for its operation and accordingly in Figure 4 the anode circuit of the pentode $b$ of the amplifier includes the primary winding $x^1$ of the output transformer $x$ having a step down ratio of about ten to one and a resistance 35 of about 5,000 ohms, the induced current in the secondary winding being rectified by the full wave rectifier "bridge" assembly $y$ the output from which is conveyed to the stylus $z$ and paper supporting bar $z^1$.

In recording instruments of this kind, in order to obtain readings extending over a considerable range of depth on a paper strip of normal width, it is usual to include a phasing arrangement by which, in effect, the datum line is shifted temporarily.

This can be accomplished by arranging that the transmitter switch is operated earlier than usual by a time which is equivalent to some known depth, say 50 fathoms. In this case 50 fathoms must be added to the scale reading. This process may be repeated several times in such a way that each time the depth indication is brought back to the beginning of the scale just as it is about to go off the scale at the deep water end.

When such a phasing arrangement is used it will be clear that the need for initial suppression of spurious noise pulses no longer exists and accordingly a switch $r^1$ is arranged in series circuit with the switch $r$, said switch $r^1$ being operated by a cam $s^4$ simultaneously with the known phasing cam $s^5$ to interrupt the circuit when the cam $s^5$ is in phasing position.

The constant speed motor employed in indicators and recorders is omitted from Figure 4 to reduce confusion.

As an alternative to the varying of bias applied to the grid $m$ of the pentode $a$ the anode potential of one or more of the valves of the amplifier may be made dependent on the voltage of a condenser which is caused to begin charging through a resistance of suitable value at the instant of transmission of the signal pulse.

The circuit of such an arrangement is shown in Figure 3 and is somewhat similar to the amplifier circuit shown in Figures 1 and 4. The essential differences between the arrangements are the connection of the low potential end of the tuned circuit $k$ $l$ to the negative leg of the filament $n$ of the pentode $a$ by the conductor 111 and the biassing battery 181 according to ordinary practice, the inclusion of the switch $r^1$ and the current limiting resistance $q$ of about 50,000 ohms in the conductor 23 conveying current from the positive terminal of the high tension battery 20 to the anode $a^1$ of the pentode $a$ and the disposition of a control condenser $o^1$ of about 2 microfarads in parallel circuit with the circuit of the anode $a^1$ and the battery 20.

The switch $r^1$ is operated by the cam $s^{11}$ (comparable with the cam $s$, Figures 1 and 4) to complete the circuit immediately prior to the moment of emission of each sound pulse and when the switch $r^1$ is closed the current flowing to the anode $a^1$ is reduced by that necessary to charge the control condenser $o^1$ so that the current flowing to the anode $a^1$, and consequently the amplification factor, steadily increases in value according to a recognised law on a definite time basis until the control condenser $o^1$ is fully charged. When the switch $r^1$ opens, the control condenser $o^1$ discharges through the anode circuit, the amplification factor falls to zero and the control condenser $o^1$ is ready for operation again when the switch $r^1$ is closed by the cam $s^{11}$.

Obviously the arrangement shown in Figure 3 will operate to produce the same control effect as that shown in Figure 1 and therefore can be associated with the recording means shown in Figure 4.

It will be obvious that in some cases the resistance $p$ or $q$ may be replaced by a five electrode thermionic valve or pentode $a^1$ as shown in Figure 5, said valve having such an anode impedance characteristic as will enable more perfect co-operation between the rate of discharge of the condenser $o$ or $o^1$ and the amplification characteristic of the amplifier to be obtained, a straight line discharge curve to the condenser $o$ or $o^1$ being obtained (except when $o$ or $o^1$ is almost completely discharged) by the use of the potentiometer 183 for applying the proper voltage to the grid $g^3$. In this arrangement the condenser $o$ is connected between the grid $g^3$ and anode of the valve $a^1$ and the proper voltage is applied to the grid $g^1$ by the battery 36 and potentiometer 361.

I claim:

1. In a multi stage audio frequency thermionic amplifier for echo sounding apparatus means for increasing the potential of the grid bias of the thermionic valve in the first stage of said amplifier at the moment of emission of each sound pulse insufficiently to obscure an echo pulse signal, means for allowing said grid bias potential to decrease gradually as a function of time during the echo time period of each sound pulse and a voltage surge intercepting filter between the first and second stages.

2. In an audio frequency thermionic amplifier for echo sounding apparatus the arrangement of an electrical control condenser in the grid circuit of one of the thermionic valves of said amplifier, a time graded charge dissipating electrical resistance connected in shunt with said condenser a source of electrical energy, a switch operated synchronously with the transmitter switch for disconnecting said condenser from said supply at the instant of transmission of a sound pulse to apply a bias potential to said grid circuit insufficient to obscure an echo pulse signal and a filter circuit for suppressing the effect of voltage surges in the anode circuit of the valve in the first stage of said amplifier due to changes of bias potential.

3. In a multi stage audio frequency thermionic amplifier for echo sounding apparatus the arrangement of an electrical control condenser in the grid circuit of one of the thermionic valves of said amplifier, a time graded charge dissipating electrical resistance connected in shunt with said condenser a source of electrical energy, a switch operated synchronously with the transmitter switch for disconnecting said condenser from said supply at the instant of transmission of a sound pulse to apply a bias potential to said grid circuit insufficient to obscure an echo pulse signal and an intervalve coupling presenting a high electrical impedance to pulses due to voltage surges in the anode circuit of the valve in the first stage of said amplifier and a low electrical impedance to signals due to echo pulses.

4. In an audio frequency thermionic amplifier for echo sounding apparatus the arrangement of means for varying the value of some of the impedances in said thermionic arrangement automatically in the desired direction relatively to a time base and means for preventing disturbance of the circuit by voltage surges in the anode circuit of the first stage of said amplifier due to variation of the impedances.

DONALD ORR SPROULE.